UNITED STATES PATENT OFFICE 2,489,363

CHLORINATED DERIVATIVES OF ALKYLENE POLYAMINES

Frederick C. Bersworth, Verona, N. J.

No Drawing. Application August 5, 1947
Serial No. 766,469

6 Claims. (Cl. 260—518)

This invention relates to new chemical compounds which are derivatives of alkylene or polyalkylene polyamines and which contain one or two chlorinated benzene radicals in the molecule. These compounds I have found to be useful as bactericides and more particularly as bactericides having polyvalent metal sequestering action.

Chlorinated aromatic compounds containing a benzenoid nucleus are known to be useful bactericides. The usefulness of these compounds is, however, somewhat limited in the presence of hard water flocks because the colloidal material tends to surround and protect bacteria.

It is an object of this invention to prepare and provide the new chemical compounds of the kind referred to above, and which have the general formula:

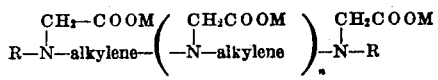

wherein R is a member of the group consisting of —CH₂COOM,

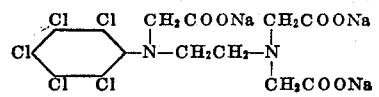

not more than one R group being —CH₂COOM, $n$ is zero or a positive integer, alkylene is an alkylene group containing not more than four carbon atoms, and M is a member of the group consisting of alkali metal and hydrogen.

The compounds of the present invention may be prepared in any of several different ways. In general the process of making the products herein described is a two-step process. The first step preferably consists in reacting an amine with a suitable halogenated compound to form an intermediate product, the intermediate product containing at least two amino nitrogen atoms. The second step consists in replacing the hydrogen atoms on the amino nitrogen atoms with acetic acid groups. Depending upon the original starting materials, the intermediate or, final product may or may not be chlorinated. The first step may be carried out by condensing an aryl amine or an aralkyl amine with an aliphatic compound in which either one or both terminal carbon atoms are bonded to a halogen atom. Alternatively this condensation may take place between an aralkyl compound having a halogen atom attached to the terminal carbon of the alkyl group and a polyamine. The aryl group may or may not be halogenated at the time of this intermediate reaction. The intermediate product may then be reacted according to my U. S. Patent 2,407,645, or to the chloracetic acid process, to replace with acetate groups the hydrogen atoms remaining on the amino nitrogen atoms. These processes, and modifications thereof, for making the compounds of this invention will be illustrated in the examples which follow.

Example I

One molar equivalent of pentachlor aniline is condensed with one molar equivalent of 1-chlor 2 amino ethane (ClCH₂CH₂NH₂) by heating the two together under substantially anhydrous conditions. The resulting product pentachlor phenyl ethylene diamine hydrochloride crystallizes out, is treated with NaOH to liberate the free base, and is then reacted with sodium cyanide, formaldehyde and sodium hydroxide according to my U. S. Patent 2,407,645 to yield a crystallizable compound believed to have the formula:

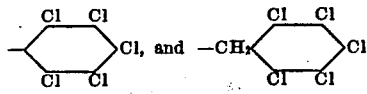

The 1-chlor 2 amino ethane may be made according to the procedure reported by Seitz B. 24, 2626.

Example II

Two molar equivalents of pentachlor aniline are condensed with one molar equivalent of di-(β-chlor ethyl) amine by heating the two together. The hydrochloride salt which crystallizes out is treated with caustic to set free the base. The resulting crystalline product having the formula

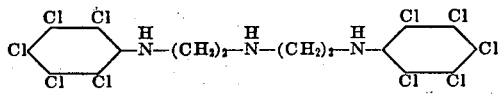

and termed sym. di(pentachlor phenyl) diethylene triamine is reacted as in Example I according to my U. S. Patent 2,407,645 to yield a crystallizable compound believed to have the formula:

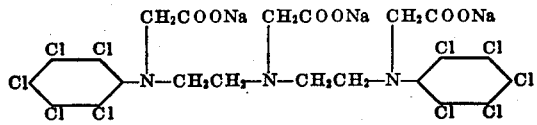

Example III

Two molar aquivalents of pentachlor aniline are reacted according to conventional procedure i. e. by mixing and heating together with one molar equivalent of ethylene dichloride. The product crystallizing out is the intermediate product as the hydrochloride. The free base is liberated with caustic. The resulting product is then reacted as in Example I according to my U. S. Patent 2,407,645 to yield a crystallizable compound believed to have the formula:

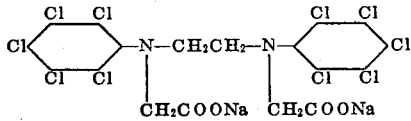

*Example IV*

One molar equivalent of pentachlor benzyl bromide is reacted by heating and mixing with a molar equivalent of diethylene triamine. After treating with caustic, the resulting product is reacted with sodium cyanide, formaldehyde and sodium hydroxide to yield a crystallizable product having the formula:

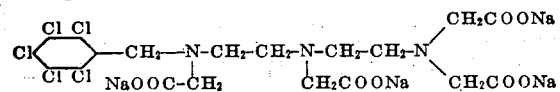

Similarly other alkylene chlorides, and polyamines may be reacted with aryl amines or arylalkyl chlorides to form the compounds of this invention. It is generally preferred to react fully chlorinated aryl groups to form the intermediate product but if chlorination is to be performed it is preferred that the reaction wherein the acetate groups replace the hydrogen atoms on the nitrogen atoms be carried out before chlorination of the intermediate product. However, it is entirely possible to first chlorinate the intermediate product although the yield of desired product may be inferior.

Among the general characteristics of the compounds of this invention are that they are excellent bactericides in general and particularly in the presence of hard water and soap. The compounds disclosed above are generally yellowish colored crystalline salts which are soluble in water, and in dilute alcohol solutions. They have an iso-electric point of between 1.2 and 1.8. The compounds may be thought of as containing "solubilizing" groups (the acetate groups) and "non-solubilizing" groups (the aryl groups). In those compounds containing multiple "solubilizing" groups and only a single "non-solubilizing" group the solubility in water is quite marked. In those compounds containing a lower ratio of "solubilizing" to "non-solubilizing" groups the solubility is decreased, although still appreciable.

If copper in ionic form is added to an aqueous solution of one of the compounds of this invention, a copper complex is apparently formed which is soluble in water. This complex has been found to be an excellent fungicide, and may be added to hard water in the presence of soap without the formation of a curdy precipitate.

The importance of the elimination of a hard water flock in the presence of a strong alkali or soap is great. It has been shown that upon the formation of a hard water flock, whether as the result of the formation of calcium hydroxide or calcium (or magnesium) soap, bacteria are protected. A medium apparently bacteria-free after treatment with phenol, and having a flock of calcium soap, was filtered, the precipitate was thoroughly washed with sterile water and added to bacteria free serum. The bacteria became active again. The compounds described herein eliminate any possibility of any contaminated flock.

I claim:

1. A compound represented by the formula:

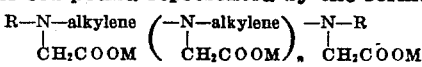

wherein R is a member of the group consisting of

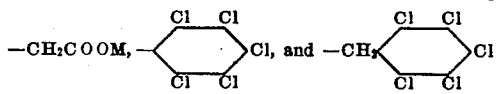

not more than one R group being —CH$_2$COOM, n is one of the group consisting of zero and a positive integer, alkylene is an alkylene group containing not more than four carbon atoms, and M is a member of the group consisting of alkali metal and hydrogen.

2. A compound according to claim 1 wherein each R is

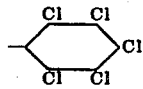

3. A compound represented by the formula

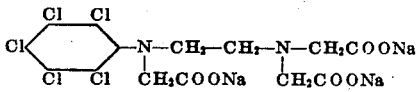

4. A compound represented by the formula

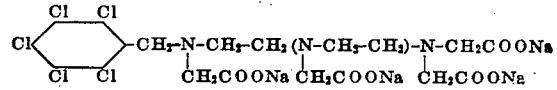

5. A compound according to claim 1 wherein each R is

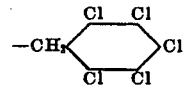

6. A compound represented by the formula

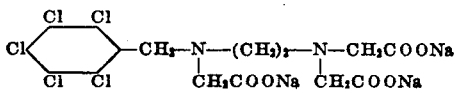

FREDERICK C. BERSWORTH.

REFERENCES CITED

The following references are of record in the file of this patent:

UNITED STATES PATENTS

| Number | Name | Date |
|---|---|---|
| 2,168,181 | Ulrich et al. | Aug. 1, 1939 |
| 2,387,976 | Bersworth | Oct. 30, 1945 |
| 2,413,856 | Bersworth | Jan. 7, 1947 |
| 2,428,353 | Bersworth | Oct. 7, 1947 |